(12) United States Patent
Karaoguz et al.

(10) Patent No.: US 8,693,484 B2
(45) Date of Patent: Apr. 8, 2014

(54) METHOD AND SYSTEM FOR PROVIDING DIRECTORY SERVICES BY A GATEWAY FOR PEER-TO-PEER COMMUNICATIONS

(75) Inventors: Jeyhan Karaoguz, Irvine, CA (US); Xuemin Chen, San Diego, CA (US); Wael William Diab, San Francisco, CA (US); David Garrett, Tustin, CA (US); David Lundgren, Mill Valley, CA (US); Rich Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 246 days.

(21) Appl. No.: 12/982,022

(22) Filed: Dec. 30, 2010

(65) Prior Publication Data
US 2011/0299542 A1 Dec. 8, 2011

Related U.S. Application Data

(60) Provisional application No. 61/351,696, filed on Jun. 4, 2010.

(51) Int. Cl.
*H04L 12/28* (2006.01)

(52) U.S. Cl.
USPC ........... 370/401; 370/229; 370/252; 370/329; 370/395.21; 370/465; 709/203; 709/226; 709/231; 455/420

(58) Field of Classification Search
USPC ............ 370/229, 230, 252, 254, 329, 395.21, 370/449, 465; 709/203, 226, 231; 455/420
See application file for complete search history.

(56) References Cited

U.S. PATENT DOCUMENTS

| 6,976,066 | B1 * | 12/2005 | Mouhanna et al. | 709/223 |
|---|---|---|---|---|
| 7,103,644 | B1 * | 9/2006 | Zhang et al. | 709/219 |
| 7,149,208 | B2 * | 12/2006 | Mattaway et al. | 370/352 |
| 7,490,293 | B1 * | 2/2009 | Humpleman et al. | 715/734 |
| 7,986,686 | B2 * | 7/2011 | Nadeau et al. | 370/386 |
| 8,015,491 | B2 * | 9/2011 | Shaver et al. | 715/719 |
| 2002/0191635 | A1 * | 12/2002 | Chow et al. | 370/463 |
| 2003/0214943 | A1 * | 11/2003 | Engstrom et al. | 370/353 |
| 2004/0172343 | A1 * | 9/2004 | Allibhoy et al. | 705/27 |
| 2004/0199667 | A1 * | 10/2004 | Dobbins | 709/240 |
| 2004/0228363 | A1 * | 11/2004 | Adamczyk et al. | 370/468 |
| 2005/0114711 | A1 * | 5/2005 | Hesselink et al. | 713/201 |
| 2005/0249196 | A1 * | 11/2005 | Ansari et al. | 370/352 |

(Continued)

*Primary Examiner* — Andrew Lai
*Assistant Examiner* — Andrew C Lee
(74) *Attorney, Agent, or Firm* — Thomas | Horstemeyer, LLP (57) ABSTRACT

A broadband gateway, which enables communication with a plurality of devices and handles at least one physical layer connection to at least one corresponding network access service provider, may be operable to identify one or more individuals with whom a user desires to engage in peer-to-peer communications. The user is associated with one or more of the plurality of devices. A directory may be generated by the broadband gateway for the peer-to-peer communications based on the identified one or more individuals. The directory may comprise name information, location information, contact information, communication device information, and/or content sharing information. The broadband gateway may communicate the directory to one or more network access service providers and/or one or more content providers. Peer-to-peer exchanges and/or network resource allocations for the peer-to-peer communications may be controlled and/or monitored by the network access services providers and/or the content providers based on information in the directory.

20 Claims, 5 Drawing Sheets

(56) References Cited

U.S. PATENT DOCUMENTS

| | | | |
|---|---|---|---|
| 2006/0028980 A1* | 2/2006 | Wright | 370/229 |
| 2006/0028983 A1* | 2/2006 | Wright | 370/230 |
| 2007/0121612 A1* | 5/2007 | Nadeau et al. | 370/386 |
| 2007/0220010 A1* | 9/2007 | Ertugrul | 707/10 |
| 2008/0133641 A1* | 6/2008 | Gent et al. | 709/201 |
| 2008/0134043 A1* | 6/2008 | Georgis et al. | 715/733 |
| 2008/0155613 A1* | 6/2008 | Benya et al. | 725/89 |
| 2008/0222127 A1* | 9/2008 | Bergin | 707/5 |
| 2010/0195666 A1* | 8/2010 | Adamczyk et al. | 370/465 |
| 2010/0197268 A1* | 8/2010 | Raleigh | 455/408 |
| 2010/0217837 A1* | 8/2010 | Ansari et al. | 709/218 |
| 2010/0229222 A1* | 9/2010 | Li et al. | 726/5 |
| 2011/0032821 A1* | 2/2011 | Morrill et al. | 370/230 |
| 2011/0243553 A1* | 10/2011 | Russell | 398/25 |
| 2011/0258049 A1* | 10/2011 | Ramer et al. | 705/14.66 |

* cited by examiner

| Directory 300 | | | | |
|---|---|---|---|---|
| User Name 301 | Contact Information 302 | Communication Device 303a | Location Information 304a | Content Sharing Information 305a |
| | | Communication Device 303b | Location Information 304b | |
| | | Communication Device 303c | Location Information 304c | Content Sharing Information 305c |
| Individual Name 311 | Contact Information 312 | Communication Device 313a | Location Information 314a | Content Sharing Information 315a |
| | | Communication Device 313b | Location Information 314b | |
| ... | ... | ... | ... | ... |

METHOD AND SYSTEM FOR PROVIDING DIRECTORY SERVICES BY A GATEWAY FOR PEER-TO-PEER COMMUNICATIONS

CROSS-REFERENCE TO RELATED APPLICATIONS/INCORPORATION BY REFERENCE

This patent application makes reference to, claims priority to, and claims benefit from U.S. Provisional Application Ser. No. 61/351,696, which was filed on Jun. 4, 2010.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981/971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,753 filed on Dec. 30, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for providing directory services by a gateway for peer-to-peer communications.

BACKGROUND OF THE INVENTION

Telecommunication technologies have evolved from analog to digital technologies, and continue to evolve from circuit switched to packet switched, from connection oriented packet switching to connectionless packet switching, and from narrow band applications to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

With the continuous growth of digital television or broadcast multimedia and/or broadband access, which may be used in conjunction with online businesses, social networks, and/ or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more display devices that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcasts, service providers may require use of dedicated equipment such as set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in home networks for the same purpose.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing directory services by a gateway for peer-to-peer communications, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for providing directory services by a gateway for peer-to-peer communications. In various embodiments of the invention, a broadband gateway, which enables communication with a plurality of devices and handles at least one physical layer connection to at least one corresponding network access service provider, may be operable to identify one or more individuals with whom a particular user may desire to engage in peer-to-peer communications. The particular user may be associated with one or more of the plurality of devices. A directory or listing associated with the identified one or more individuals may be generated by the broadband gateway for supporting the peer-to-peer communications based on the identified one or more individuals. The peer-to-peer communications may comprise, for example, content sharing, files sharing, website hosting and/or video gaming.

The at least one physical layer connection may comprise, for example, a plurality of physical layer connections and the at least one corresponding network access service provider may comprise a plurality of corresponding network access service providers. In this regard, each of the plurality of physical layer connections may correspond to a respective one of the plurality of corresponding network access service providers.

In an exemplary embodiment of the invention, the directory may comprise name information, location information, contact information, communication device information, content sharing information and/or other related information which are associated with the particular user and each of the one or more individuals. The one or more individuals may be identified and/or the directory may be generated, based on inputs or suggestions from, for example, the particular user, one or more other broadband gateways, one or more network access service providers and/or one or more content providers.

The broadband gateway may be operable to communicate the generated directory to one or more network access service providers and/or one or more content providers, for example. Accordingly, peer-to-peer exchanges and/or network resource allocations for supporting the peer-to-peer communications may be controlled and/or monitored by the one or more network access service providers and/or the one or more content providers based on information in the directory, for example.

Figure 1:
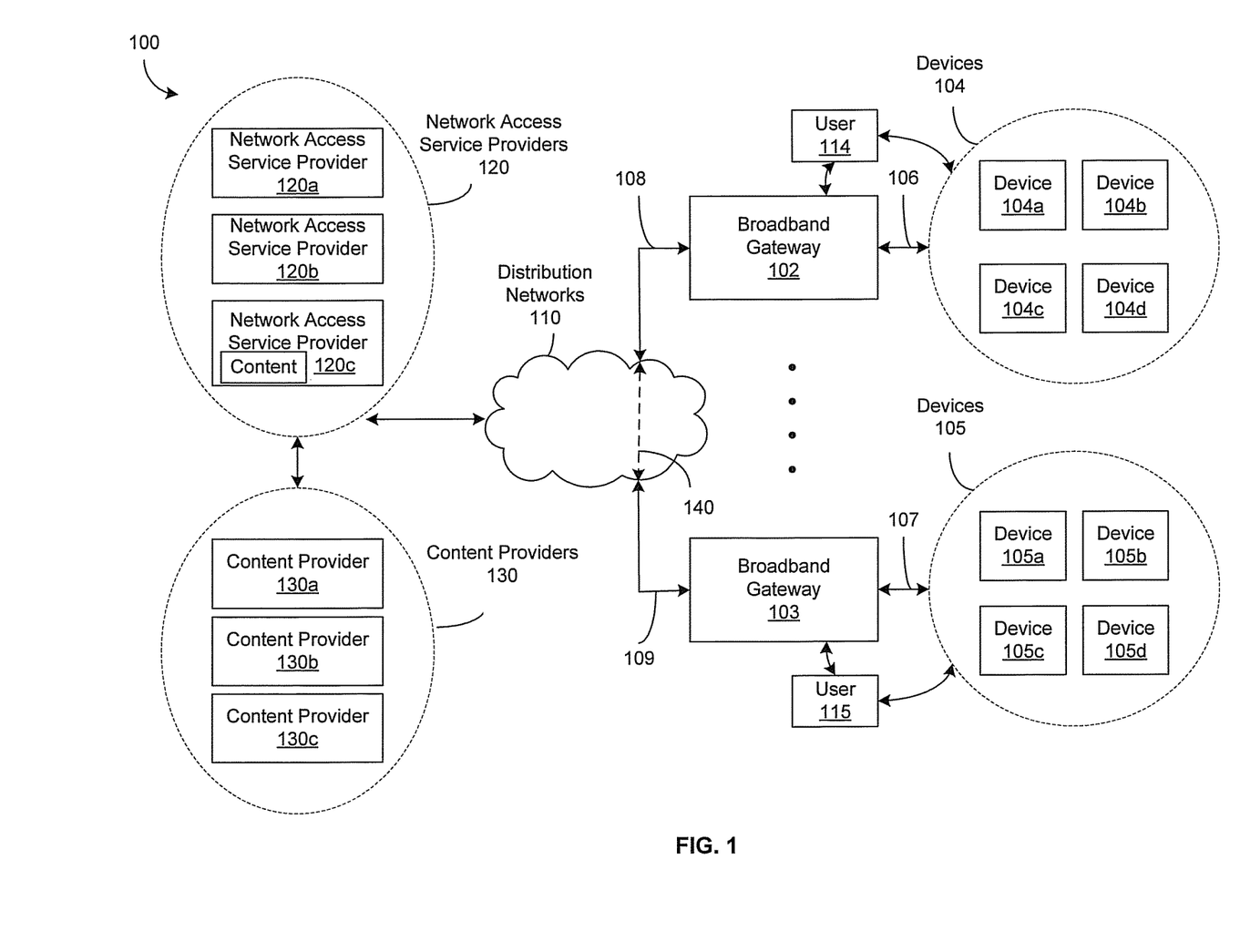
FIG. 1 is a block diagram illustrating an exemplary communication system that is operable to provide directory services by a gateway for peer-to-peer communications, in accordance with an embodiment of the invention.

FIG. 1 is a block diagram illustrating an exemplary communication system that is operable to provide directory services by a gateway for peer-to-peer communications, in accordance with an embodiment of the invention. Referring to FIG. 1, there is shown a communication system 100. The communication system 100 may comprise a plurality of broadband gateways of which broadband gateways 102, 103 are illustrated, a plurality of distribution networks 110, a plurality of devices 104a-104d, 105a-105d, which are collectively referred to herein as devices 104 and 105 respectively, a plurality of network access service providers 120 of which network access service providers 120a-120c are illustrated and a plurality of content providers 130 of which content providers 130a-130c are illustrated. The devices 104a-104d may be serviced by the broadband gateway 102. A user 114 may be associated with one or more of the devices 104a-104d. The devices 105a-105d may be serviced by the broadband gateway 103. A user 115 may be associated with one or more of the devices 105a-105d.

A content provider such as the content provider 130a may comprise suitable logic, circuitry, interfaces and/or code that may be operable to generate, capture and/or package content such as, for example, multimedia content that may be distributed to one or more of the devices 104a-104d, 105a-105d via one or more of the network access service providers 120a-120c and the corresponding broadband gateways 102, 103. The content may be, for example, downloadable or streaming, and/or rented or purchased. In an exemplary embodiment of the invention, a content provider, such as the content provider 130a, may provide inputs to the broadband gateway 102 for identifying one or more individuals such as the user 115, and/or for generating a directory for peer-to-peer communications between the user 114 and one or more of the identified individuals such as the user 115. The content provider 130a may then control and/or monitor peer-to-peer exchanges or content sharing based on information provided in the directory.

A network access service provider such as the network access service provider 120a may comprise suitable logic, circuitry, interfaces and/or code that may be operable to provide services using different access technologies to one or more of the devices 104a-104d, 105a-105d for end-users via the corresponding broadband gateways 102, 103. The services may include, but are not limited to, multimedia, television, Internet, phone, Ethernet, multimedia over coax alliance (MoCA), passive optical network (PON), and/or cellular services, for example. The network access service providers 120 may provide physical layer connections to the broadband gateways 102, 103. Such physical layer connections may then be utilized by the broadband gateways 102, 103 to access content provided by the content providers 130, to access services provided by other service providers, and/or to access an intranet or the Internet at-large. In this regard, "network access service provider" as utilized herein, is distinguished from the more generic term "service provider" which may encompass services other than providing physical layer access. Cable television (CATV) providers, plain old telephone service (POTS) providers, digital subscriber line (DSL) providers, cellular service providers, WiMAX providers and/or satellite providers are examples of the network access service providers 120. In some instances, a network access service provider such as the network access service provider 120c may be a provider that provides both content and services.

In an exemplary embodiment of the invention, a network access service provider, such as the network access service provider 120c, may provide inputs to the broadband gateway 102 for identifying one or more individuals such as the user 115, and/or for generating a directory for peer-to-peer communications between the user 114 and one or more of the identified individuals such as the user 115. The network access service provider 120c may then control and/or monitor peer-to-peer exchanges and/or network resource allocations for supporting the peer-to-peer communications based on information provided in the directory.

A broadband gateway such as the broadband gateway 102 may comprise suitable logic, circuitry, interfaces and/or code that may be operable to provide an interface and connectivity between one or more of the devices 104a-104d and one or more of the distribution networks 110. For example, the broadband gateway 102 may support configuring and/or using a plurality of broadband connections 108 to the distribution networks 110. The broadband connections 108 may comprise wired and/or wireless connections between the broadband gateway 102 and the distribution networks 110. In this regard, the broadband gateway 102 may be operable to perform and/or provide various services that may pertain to enabling and/or facilitating reception of content such as multimedia content from one or more of the content providers 130a-130c. The content may be delivered through one or more of the network access service providers 120. The broadband gateway 102 may communicate with various devices 104a-104d using wired, optical and/or wireless communication links 106. Similarly, the broadband gateway 103 may support configuring and/or using a plurality of broadband connections 109 to the distribution networks 110. The broadband gateway 103 may communicate with various devices 105a-105d using wired, optical and/or wireless communication links 107.

A single broadband gateway such as the broadband gateway 102 may be operable to handle a plurality of physical layer connections to the distribution networks 110, where different ones or portions of the distribution networks 110 may be owned, operated, leased or associated with different ones of the network access service providers 120. A physical layer may refer to an open systems interconnection (OSI) layer 1. In this regard, for example, a first network access service provider such as network access the service provider 120a may provide network access to the broadband gateway 102 via a DSL connection over twisted-pair cabling, and a second network access service provider such as the network access service provider 120b may provide network access to the broadband gateway 102 via a cable television connection over coaxial cabling. In some instances, the broadband gateway 102 may be operable to concurrently communicate over the plurality of physical layer connections provided by the plurality of network access service providers 120.

A broadband gateway such as the broadband gateway 102 may be located at a residential location such as a home. The broadband gateway 102 may also be located in non-residential location comprising, for example, a commercial building, an office, an office complex, an apartment building and/or a factory. While the broadband gateway 102 may be illustrated as a single and separate device in FIG. 1, the invention may not be so limited. In one embodiment of the invention, some functionalities of the broadband gateway 102 may be implemented in a distributed manner over two or more devices locally and/or remotely. For example, some of the functionalities of the broadband gateway 102 may be implemented within one of the televisions available in the home. Furthermore, the broadband gateway 102 may be implemented as a virtual platform, for example.

In an exemplary embodiment of the invention, a broadband gateway such as the broadband gateway 102 may be operable to generate a directory for the user 104 for supporting peer-to-peer communications with other individuals such as the user 115. The broadband gateway 102 may share the directory information with one or more network access service providers such as the network access service provider 120c and/or one or more content providers such as the content provider 130a. The directory information may then be utilized by the one or more network access service providers such as the network access service provider 120c and/or the one or more content providers such as the content provider 130a for controlling and/or monitoring peer-to-peer exchanges and/or network resource allocations.

A device such as the device 104a may comprise suitable logic, circuitry, interfaces and/or code that may be operable to interact with the broadband gateway 102. The devices 104a-104d serviced by, and/or connected with the broadband gateway 102 may comprise content consuming devices and/or non-content consuming household devices. For example, the devices 104 may comprise a television, a set-top box (STB), a laptop computer, a smoke detector, a carbon monoxide detector, a security alarm, a desk top computer and/or server, a mobile phone, a speaker, an AM/FM radio, a phone, and/or an appliance such as a refrigerator. The devices 104a-104d may interact with the broadband gateway 102 via the links 106 utilizing various wired and/or wireless communication technologies such as, for example, Bluetooth, LTE, WiFi and/or Ethernet. Similarly, the devices 105a-105d may interact with the broadband gateway 103 via the links 107 utilizing various wired and/or wireless communication technologies. One or more of the devices 104a-104d may be associated with the user 114, and one or more of the devices 105a-105d may be associated with the user 115.

In the exemplary embodiment of the invention illustrated in FIG. 1, although the devices 104a-104d communicate with only the broadband gateway 102 as shown and the devices 105a-105d communicate with only the broadband gateway 103 as shown, the invention may not be so limited. Accordingly, the devices 104a-104d may communicate with multiple broadband gateways in a local or home network and the devices 105a-105d may communicate with multiple broadband gateways in a local or home network without departing from the spirit and scope of various embodiments of the invention.

The distribution networks 110 may comprise suitable logic, circuitry, communication devices, interfaces and/or code that may be operable to enable wireless and/or wired communication among a plurality of local and/or remote entities, based on one or more networking and/or communication infrastructures. In this regard, one or more of the distribution networks 110 may be utilized to enable distribution of content such as multimedia content generated by one or more of the content providers 130a-130c, via one or more of the network access service providers 120a-120c, to one or more of the devices 104a-104d, 105a-105d. The network connectivity available via the distribution networks 110 may be based on one or more communication standards and/or protocols. The distribution networks 110 may comprise, for example, Internet, cable television (CATV) network, satellite television (TV) network, wired or wireless local area network (LAN), wired or wireless wide area network (WAN), personal area network (PAN) and/or cellular network. In an exemplary embodiment of the invention, the distribution networks 110 may provide resources to support peer-to-peer communications between, for example, a communication device such as the device 104a associated with the user 114 and a communication device such as the device 105a associated with the user 115, as illustrated by the link 140. For example, the distribution networks 110 may allocate necessary network communication devices to establish the link 140 for supporting the peer-to-peer communications. The network communication devices may comprise, for example, layer 1 hubs, layer 2 or layer 3 switches, routers and/or other network communication devices.

In operation, the broadband gateway 102 may be operable to identify one or more individuals such as the user 115 with whom the user 114 may desire to engage in peer-to-peer communications. A directory which comprises information related to the user 114 and each of the one or more individuals may be generated by the broadband gateway 102 for supporting the peer-to-peer communications. In this regard, the peer-to-peer communications may comprise, for example, content sharing, files sharing, website hosting and/or video gaming. The directory may comprise name information, location information, contact information, communication device information, content sharing information and/or other related information which are associated with the user 114 and each of the one or more individuals such as the user 115. For example, the directory may comprise a communication device such as the device 104a which is associated with the user 114. The directory may provide information indicating that the device 104a comprises some particular video content which may be shared via peer-to-peer communications with each of the one or more individuals in the directory such as the user 115.

In an exemplary embodiment of the invention, the one or more individuals may be identified and/or the directory may be generated, based on inputs or suggestions from the user 114, one or more other broadband gateways such as the broadband gateway 103, one or more network access service providers such as the network access service provider 120c and/or one or more content providers such as the content provider 130a.

In an exemplary embodiment of the invention, the broadband gateway 102 may be operable to communicate and/or share the generated directory to one or more network access service providers such as the network access service provider 120c and/or one or more content providers such as the content provider 130a. Accordingly, peer-to-peer exchanges and/or network resource allocations for supporting the peer-to-peer communications may be controlled and/or monitored by the one or more network access service providers such as the network access service provider 120c and/or the one or more content providers such as the content provider 130a, based on information in the directory. In this regard, for example, the content provider 130a may control and/or monitor the content sharing between the device 104a associated with the user 114 and the device 105a associated with the user 115, based on the content sharing information provided in the directory. The content sharing information may provide the content provider 130a with information such as availability and/or permission of the content sharing. The network access service provider 120c may control and/or monitor the network resource allocations associated with the peer-to-peer link 140 for supporting the peer-to-peer content sharing, based on the location information provided in the directory, for example. The location information may provide the network access service provider 120c with physical locations or addresses associated with the device 104a and the device 105a. Accordingly, the network access service provider 120c may allocate available network communication devices and/or resources such as bandwidth and cache stores, to establish the peer-to-peer link 140. In instances when one or more network communication devices such as a switch in the link 140 become unavailable during the peer-to-peer content sharing, the network access service provider 120c may switch the unavailable switch to other available switch so as to keep the peer-to-peer link 140 available for the peer-to-peer content sharing, for example.

Figure 2:
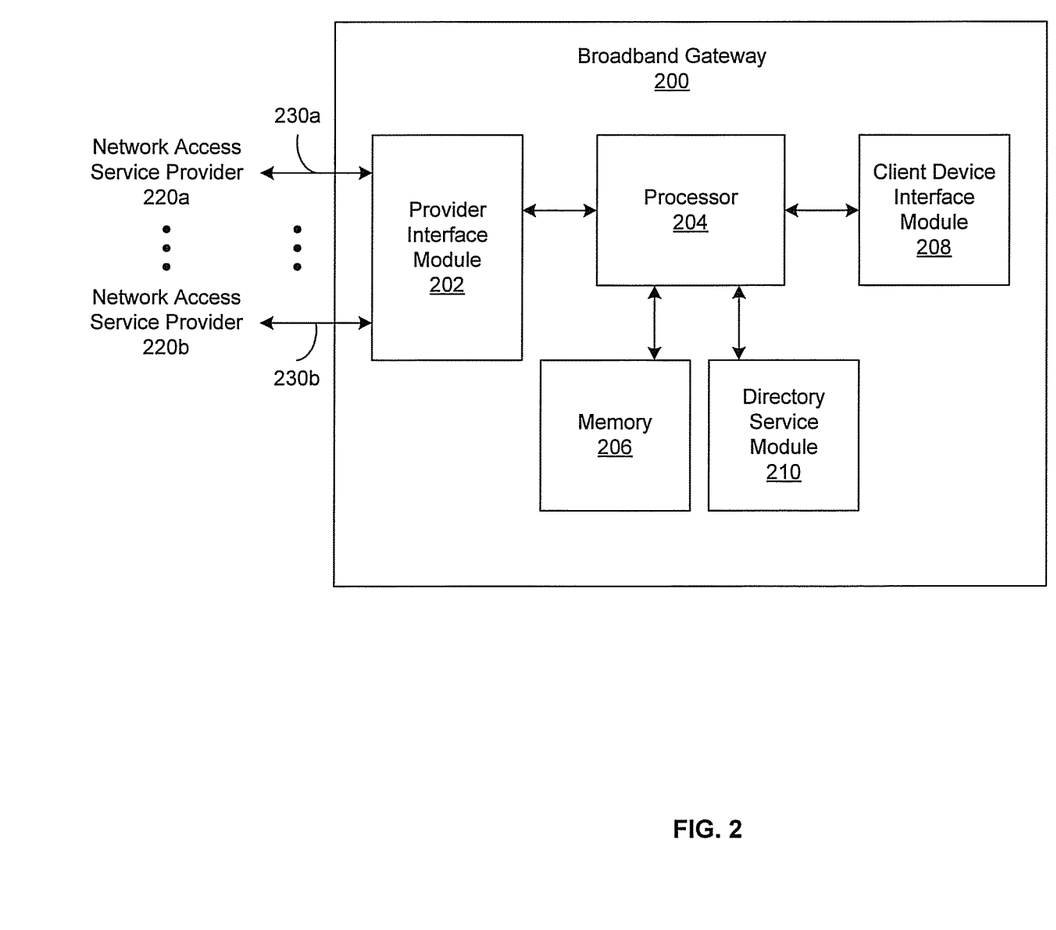
FIG. 2 is a block diagram illustrating an exemplary broadband gateway that is operable to provide directory services for peer-to-peer communications, in accordance with an embodiment of the invention.

FIG. 2 is a block diagram illustrating an exemplary broadband gateway that is operable to provide directory services for peer-to-peer communications, in accordance with an embodiment of the invention. Referring to FIG. 2, there is shown a broadband gateway 200. The broadband gateway 200 may be substantially similar to the broadband gateway 102 in FIG. 1. The broadband gateway 200 may comprise a provider interface module 202, a processor 204, a memory 206, a client device interface module 208 and a directory service module 210.

The provider interface module 202 may comprise suitable logic, circuitry, interfaces and/or code that may be operable to receive data from one or more network access service providers 220a-220b. The provider interface module 202 may also be operable to send data to one or more network access service providers 220a-220b. The provider interface module 202 may be operable to support multiple communication protocols, standards, and/or data transport technologies. The provider interface module 202 may be communicatively coupled to one or more network access service providers 220a-220b via one or more physical layer connections 230a-230b. In this regard, each of the physical layer connections 230a-230b may connect the broadband gateway 200 to one of different network access service providers 220a-220b. Each of the physical layer connections 230a-230b may comprise a wired, optical and/or wireless connection. For example, the physical layer connection 230a may comprise a DSL over twisted-pair connection while the physical layer connection 230b may comprise a CATV over coaxial cable connection.

The processor 204 may comprise suitable logic, circuitry, interfaces and/or code that may be operable to process data received from the network access service providers 220a-220b and/or the content providers 130a-130c and/or data received from one or more of the devices 104a-104d. In this regard, the processor 204 may comprise one or more portions that are suitable to handle certain types of data such as video data and/or audio data, for example.

The directory service module 210 may comprise suitable logic, circuitry, interfaces and/or code that may be operable to identify one or more individuals for a user such as the user 114, where the user 114 may desire to engage in peer-to-peer communications with each of the one or more individuals such as the user 115. The directory service module 210 may generate or construct a directory based on information associated with the identified one or more individuals. The directory service module 210 may share the directory information with one or more network access service providers such as the network access service provider 220a and/or one or more content providers such as the content provider 130a for controlling and/or monitoring peer-to-peer exchanges and/or network resource allocations.

The memory 206 may comprise suitable logic, circuitry, interfaces and/or code that may be operable to store data utilized in the operations of the broadband gateway 200. For example, the memory 206 may be utilized to store configuration data, parameters, device information, tracking and/or monitoring information, security information, and intermediate processing data, for example. In an exemplary embodiment of the invention, the memory 206 may be operable to store a directory generated by the directory service module 210. The memory 206 may comprise storage media integrated in the broadband gateway 200 and/or a removable storage device.

The client device interface module 208 may comprise suitable logic, circuitry, interfaces and/or code that may be operable to send data to one or more of the devices such as the devices 104a-104d in a local or home network. The client device interface module 208 may also be operable to receive data from one or more of the devices 104a-104d in the local or home network. The client device interface module 208 may be operable to support multiple communication protocols, standards, and/or data transport technologies.

In operation, a broadband gateway such as the broadband gateway 200 may provide connections and/or interfaces for various devices such as the devices 104a-104d to distribution networks such as the distribution networks 110. One or more of the devices 104a-104d may be associated with a user such as the user 114. The directory service module 210 in the broadband gateway 200 may be operable to identify one or more individuals such as the user 115 with whom the user 114 may have a desire to engage in peer-to-peer communications. A directory which comprises information related to the user 114 and each of the one or more individuals may be generated by the directory service module 210 for supporting the peer-to-peer communications. The directory may comprise, for example, name information, location information, contact information, communication device information, content sharing information and/or other related information which are associated with the user 114 and each of the one or more individuals such as the user 115. For example, the directory may comprise a communication device such as the device 104a which is associated with the user 114 and a communication device such as the device 105a which as associated with the user 115. The directory information may indicate that the device 104a comprises some particular content file which may be shared, via peer-to-peer communications, with the device 105a associated with the user 115, for example.

In an exemplary embodiment of the invention, the directory service module 210 may identify the one or more individuals and/or construct the directory based on inputs and/or suggestions from the user 114, from one or more other broadband gateways such as the broadband gateway 103, from one or more network access service providers such as the network access service provider 220a and/or from one or more content providers such as the content provider 130a.

In an exemplary embodiment of the invention, the directory service module 210 may communicate and/or share the generated directory to one or more network access service providers such as the network access service provider 220a and/or one or more content providers such as the content provider 130a. Accordingly, peer-to-peer exchanges and/or network resource allocations for supporting the peer-to-peer communications may be controlled and/or monitored by the one or more network access service providers such as the network access service provider 220a and/or the one or more content providers such as the content provider 130a, based on information in the directory. In this regard, for example, a content file that is exchanged between the device 104a associated with the user 114 and the device 105a associated with the user 115 may be controlled and/or monitored by the content provider 130a, based on the content sharing information provided in the directory. The network resource allocations associated with the peer-to-peer communication link such as the link 140 for supporting the peer-to-peer content file exchanges may be controlled and/or monitored by the network access service provider 220a, based on the location information associated with the device 104a and the device 105a.

Figure 3:
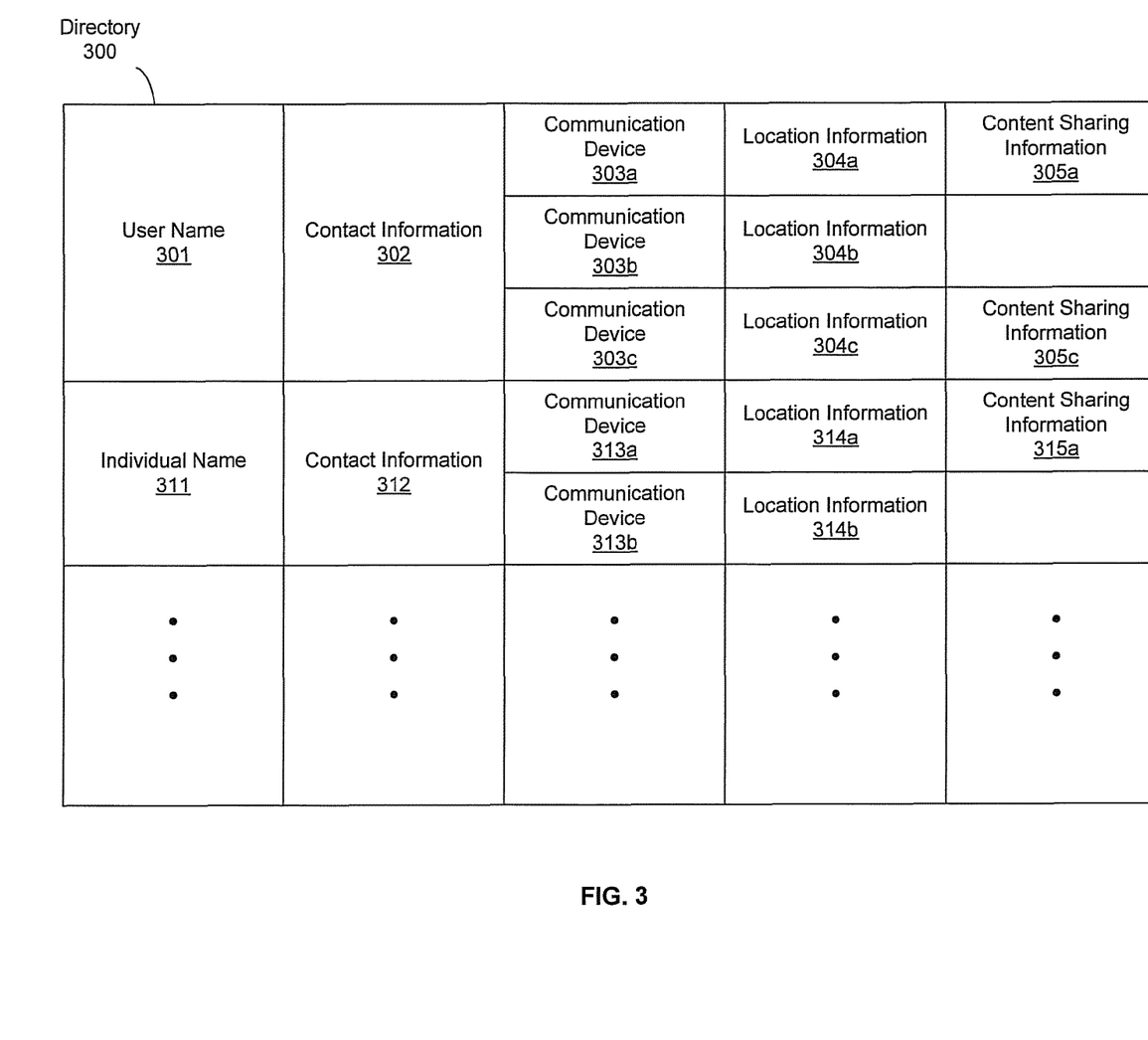
FIG. 3 is a block diagram illustrating an exemplary directory for peer-to-peer communications, in accordance with an embodiment of the invention.

FIG. 3 is a block diagram illustrating an exemplary directory for peer-to-peer communications, in accordance with an embodiment of the invention. Referring to FIG. 3, there is shown a directory 300. The directory 300 may comprise a user name 301, one or more individual names of which individual name 311 is illustrated, a plurality of contact information of which contact information 302, 312 are illustrated, a plurality of communication devices of which communication devices 303a-303c, 313a-313b are illustrated, a plurality of location information of which location information 304a-304c, 314a-314b are illustrated, and a plurality of content sharing information of which content sharing information 305a, 305c, 315a are illustrated. A user with the user name 301 may be substantially similar to the user 114 in FIG. 1. An individual with the individual name 311 may be substantially similar to the user 115 in FIG. 1. The contact information 302 and the communication devices 303a-303c are associated with the user name 301. The contact information 312 and the communication devices 313a-313b are associated with the individual name 311. The location information 304a and the content sharing information 305a are associated with the communication devices 303a. The location information 304b is associated with the communication device 303b. The location information 304c and the content sharing information 305c are associated with the communication device 303c. The location information 314a and the content sharing information 315a are associated with the communication device 313a. The location information 314b is associated with the communication device 313b. The content sharing information such as the content sharing information 305a may comprise, for example, a name, a type and/or a provider of the content in the communication device 303a and may comprise information pertaining to availability and/or permission for peer-to-peer content sharing or exchange with other communication devices in the directory, such as the communication devices 303b, 303c, 313a and/or 313b.

In an exemplary embodiment of the invention, the directory service module 210 in the broadband gateway 200 may be operable to identify one or more individuals such as an individual with the individual name 311 for peer-to-peer communications with a user such as a user with the user name 301. The directory 300 may be generated or constructed by the directory service module 210 for supporting the peer-to-peer communications among the user with the user name 301 and one or more identified individuals such as the individual with the individual name 311. The directory service module 210 may communicate or share the directory 300 with one or more network access service providers such as the network access service provider 220a and/or one or more content providers such as the content provider 130a. In this regard, for example, the content sharing or exchange between the communication device 303a and the communications device 313b may be controlled and/or monitored by the content provider 130a, based on the content sharing information 305a in the directory 300. The network resource allocations for supporting the peer-to-peer communications between the communication device 303a and the communication device 313b may be managed by the network access service provider 220a, based on the location information 304a and the location information 314b in the directory 300.

In the exemplary embodiment of the invention illustrated in FIG. 3, only the contact information 302, 312, the communication devices 303a-303c, 313a-313b, the location information 304a-304c, 314a-314b and the content sharing information 305a, 305c, 315a are shown. Notwithstanding, the invention is not so limited and other related information may also be illustrated without departing from the spirit and scope of various embodiments of the invention.

Figure 4:
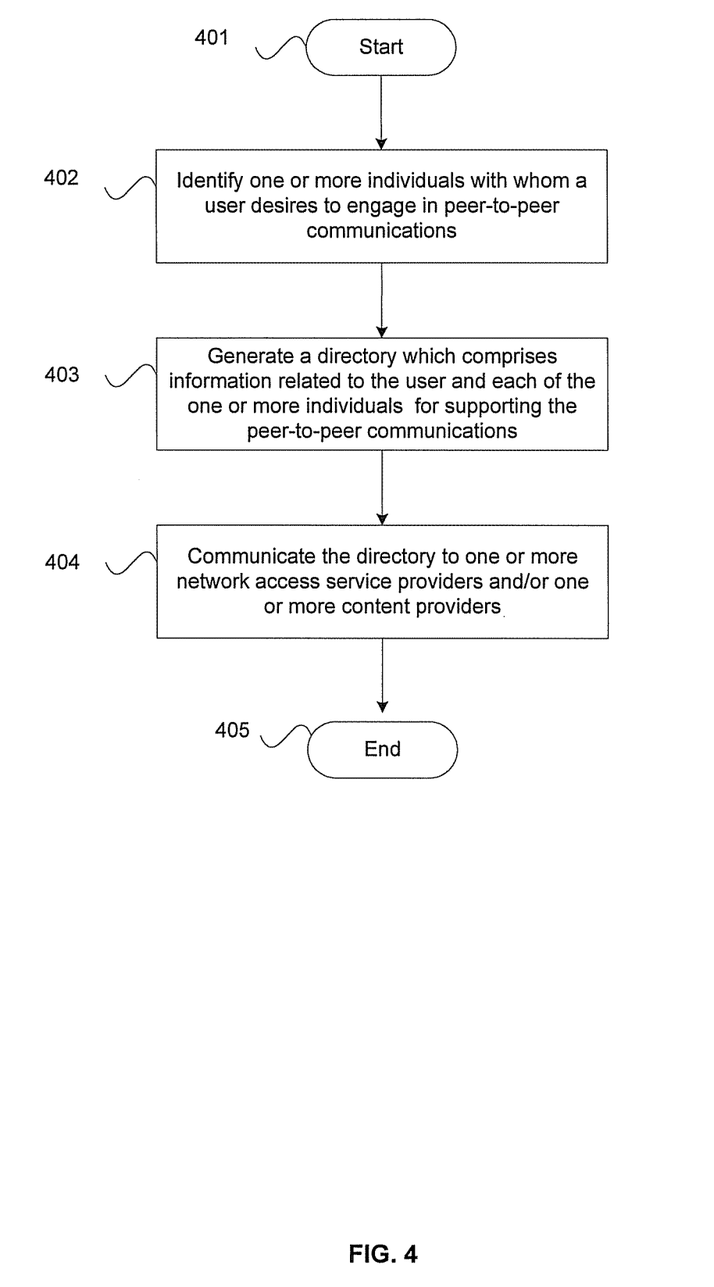
FIG. 4 is a flow chart illustrating exemplary steps for providing directory services by a gateway for peer-to-peer communications, in accordance with an embodiment of the invention.

FIG. 4 is a flow chart illustrating exemplary steps for providing directory services by a gateway for peer-to-peer communications, in accordance with an embodiment of the invention. Referring to FIG. 4, the exemplary steps start at step 401. In step 402, the directory service module in the broadband gateway 200 may be operable to identify one or more individuals with whom a user such as the user 114 may have a desire to engage in peer-to-peer communications. The identification of the one or more individuals such as the user 115 may be initiated or suggested by the user 114. In step 403, the directory service module 210 may generate or construct a directory 300 which may comprise information related to the user 114 and each of the identified one or more individuals such as the user 115 for supporting the peer-to-peer communications. The generation of the directory 300 may be based on inputs and/or suggestions from, for example, the user 114, one or more other broadband gateways such as the broadband gateway 103, one or more network access service providers such as the network access service provider 220a, and/or one or more content providers such as the content provider 130a.

In step 404, the directory service module 210 may communicate or share the directory 300 to the one or more network access service providers such as the network access service provider 220a and/or the one or more content providers such as the content provider 1308. In this regard, peer-to-peer exchanges and/or network resource allocations for supporting the peer-to-peer communications may be controlled and/or monitored based on information in the directory 300. The exemplary steps may proceed to the end step 405.

Figure 5:
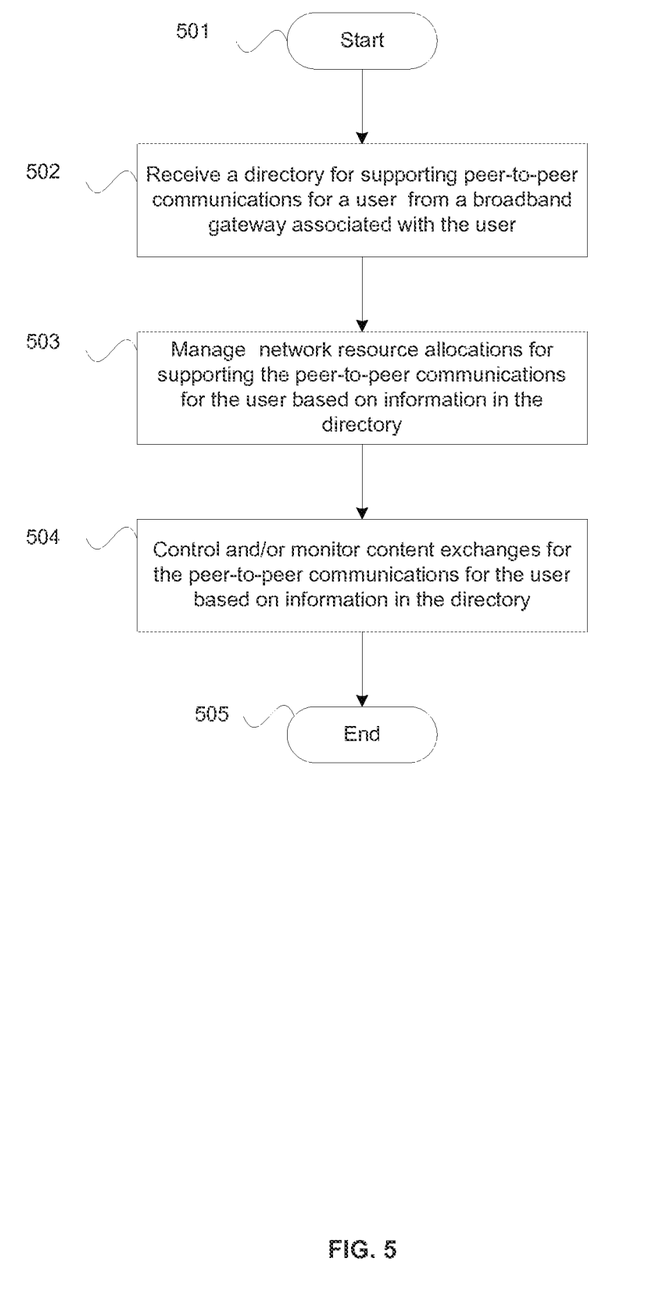
FIG. 5 is a flow chart illustrating exemplary steps for controlling and/or monitoring peer-to-peer communications based on information in directory, in accordance with an embodiment of the invention.

FIG. 5 is a flow chart illustrating exemplary steps for controlling and/or monitoring peer-to-peer communications based on information in directory, in accordance with an embodiment of the invention. Referring to FIG. 5, the exemplary steps start at step 501. In step 502, a network access service provider such as the network access service provider 120c may be operable to receive a directory 300 for supporting peer-to-peer communications for a user such as the user 114 from a broadband gateway 102 associated with the user 114. In step 503, the network access service provider 120c may manage network resource allocations for supporting the peer-to-peer communications for the user 114 based on information such as location information 304a, 314b in the directory 300. In step 504, the network access service provider 120c, which also provides content services, may be operable to control and/or monitor content exchanges for the peer-to-peer communications for the user 114 based on information such as content sharing information 305a in the directory 300. The exemplary steps may proceed to the end step 505.

In various embodiments of the invention, a broadband gateway 102, 200 may communicate with a plurality of devices 104a-104d and may handle at least one physical layer connection to at least one corresponding network access service provider. In this regard, for example, the at least one physical layer connection may comprise, for example, a plurality of physical layer connections 230a-230b and the at least one corresponding network access service provider may comprise a plurality of corresponding network access service providers 220a-220b. Each of the plurality of physical layer connections 230a-230b may correspond to a respective one of the plurality of corresponding network access service providers 220a-220b.

A directory service module 210 in the broadband gateway 200 may be operable to identify one or more individuals with whom a particular user such as the user 114 may desire to engage in peer-to-peer communications. The user 114 may be associated with one or more of the plurality of devices 104a-104. A directory or listing associated with the identified one or more individuals such as the user 115 may be generated by the directory service module 210 for supporting the peer-to-peer communications based on the identified one or more individuals. In this regard, for example, the peer-to-peer communications may comprise content sharing, files sharing and/or video gaming.

In an exemplary embodiment of the invention, the directory 300 may comprise name information 301, 311, location information 304a-304c, 314a-314b, contact information 302, 312, communication device information 303a-303c, 313a-313b, content sharing information 305a, 305c, 315a, and/or other related information which are associated with the user 114 and each of the one or more individuals such as the user 115. The one or more individuals may be identified and/or the directory 300 may be generated, based on inputs or suggestions from, for example, the user 114, one or more other broadband gateways such as the broadband gateway 103, one or more network access service providers such as the network access service provider 120c and/or one or more content providers such as the content provider 130a.

The directory service module 210 may be operable to communicate the generated directory 300 to one or more network access service providers such as the network access service provider 220a and/or one or more content providers such as the content provider 130a, for example. Accordingly, peer-to-peer exchanges and/or network resource allocations for supporting the peer-to-peer communications may be controlled and/or monitored by the one or more network access service providers such as the network access service provider 220a and/or the one or more content providers such as the content provider 130a, based on information in the directory 300, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing directory services by a gateway for peer-to-peer communications.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    in a broadband gateway that enables communication with a plurality of devices, wherein the broadband gateway is operable to handle at least one physical layer connection to at least one corresponding network access service provider:
        receiving at least one input from a first user, the first user being associated with a first one of the plurality of devices;
        identifying, based at least in part on the at least one input, a second user, the second user being associated with a second one of the plurality of devices;
        generating, by the broadband gateway, in response to identifying the second user, a directory supporting peer-to-peer communications by the first user with at least the second user, the directory comprising at least one of name information, location information, contact information, communication device information, or content sharing information for the first user and at least one of name information, location information, contact information, communication device information, or content sharing information for the second user; and
        communicating, by the broadband gateway, the directory to at least one network access service provider, wherein the at least one network access service provider, based at least in part on the directory, allocates at least one network resource, the at least one network resource being used to support peer-to-peer communications between the first user and the second user.

2. The method according to claim 1, wherein the at least one physical layer connection comprises a plurality of physical layer connections and the at least one corresponding network access service provider comprises a plurality of corresponding network access service providers, and each of the plurality of physical layer connections corresponds to a respective one of the plurality of corresponding network access service providers.

3. The method according to claim 1, comprising generating the directory based at least in part on the at least one input from the first user.

4. The method according to claim 1, comprising identifying the second user or generating the directory or both based at least in part on at least one input from at least one other broadband gateway.

5. The method according to claim 1, comprising identifying the second user or generating the directory or both based at least in part on at least one input from at least one network access service provider.

6. The method according to claim 1, comprising identifying the second user or generating the directory or both based at least in part on at least one input from at least one content provider.

7. The method according to claim 1, further comprising communicating the directory to at least one content provider.

8. The method according to claim 7, wherein the at least one content provider, based at least in part on the directory, monitors at least one peer-to-peer communication between the first user and the second user.

9. The method according to claim 1, wherein the at least one network access service provider allocates a network communication device to be available for peer-to-peer communications based on a schedule determined from the directory.

10. The method according to claim 9, wherein the network communication device comprises a network switch.

11. A system for communication, the system comprising:
    one or more processors, one or more circuits, or any combination thereof for use in a broadband gateway that enables communication with a plurality of devices, the broadband gateway being operable to handle at least one physical layer connection to at least one corresponding network access service provider, and the one or more processors, one or more circuits, or any combination thereof being operable to:
    receive at least one input from a first user, the first user being associated with a first one of the plurality of devices;
    identify, based at least in part on the at least one input, a second user, the second user being associated with a second one of the plurality of devices;
    generate, in response to identifying the second user, a directory supporting peer-to-peer communications by the first user with at least the second user, the directory comprising at least one of name information, location information, contact information, communication device information, or content sharing information for the first user and at least one of name information, location information, contact information, communication device information, or content sharing information for the second user; and communicate the directory to at least one network access service provider, wherein the at least one network access service provider, based at least in part on the directory, allocates at least one network resource, the at least one network resource being used to support peer-to-peer communications between the first user and the second user.

12. The system according to claim 11, wherein the at least one physical layer connection comprises a plurality of physical layer connections and the at least one corresponding network access service provider comprises a plurality of corresponding network access service providers, and each of the plurality of physical layer connections corresponds to a respective one of the plurality of corresponding network access service providers.

13. The system according to claim 11, wherein the one or more processors, one or more circuits, or any combination thereof are operable to generate the directory based at least in part on the at least one input from the first user.

14. The system according to claim 11, wherein the one or more processors, one or more circuits, or any combination thereof are operable to identify the second user or generate the directory or both based at least in part on at least one input from at least one other broadband gateway.

15. The system according to claim 11, wherein the one or more processors, one or more circuits, or any combination thereof are operable to identify the second user or generate the directory or both based at least in part on at least one input from at least one network access service provider.

16. The system according to claim 11, wherein the one or more processors, one or more circuits, or any combination thereof are operable to identify the second user or generate the directory or both based at least in part on at least one input from at least one content provider.

17. The system according to claim 11, wherein the one or more processors, one or more circuits, or any combination thereof are operable to communicate the directory to at least one content provider.

18. The system according to claim 17, wherein the at least one content provider, based at least in part on the directory, monitors at least one peer-to-peer communication between the first user and the second user.

19. The system according to claim 11, wherein the at least one network access service provider allocates a network communication device to be available for peer-to-peer communications based on a schedule determined from the directory.

20. The system according to claim 19, wherein the network communication device comprises a network switch.

* * * * *